United States Patent [19]
Richards, Jr.

[11] 3,775,132
[45] Nov. 27, 1973

[54] PRECIPITATION OF METAL PROTEINATES FROM BRINES BY BASE-ACID-BASE HYDROLYSIS

[75] Inventor: Albert Z. Richards, Jr., Salt Lake City, Utah

[73] Assignee: Key Minerals Corporation, Salt Lake City, Utah

[22] Filed: Jan. 8, 1971

[21] Appl. No.: 105,087

Related U.S. Application Data

[63] Continuation-in-part of Ser. No. 787,147, Dec. 26, 1968, abandoned.

[52] U.S. Cl. .................. 426/364, 71/23, 260/534 R
[51] Int. Cl. ...................... A23k 1/175, C05f 11/00
[58] Field of Search ........................ 99/2, 7, 17, 18; 210/50, 53, 54; 71/11, 21, 23, 25; 23/298, 300; 260/534 R

[56] References Cited
UNITED STATES PATENTS

| | | | |
|---|---|---|---|
| 2,617,729 | 11/1952 | Pacau | 99/7 X |
| 3,050,383 | 8/1962 | Wilson | 71/11 |
| 3,374,081 | 3/1968 | Miller | 71/11 |
| 3,396,104 | 8/1968 | Miller | 71/23 |
| 3,574,592 | 4/1971 | Hartung | 71/23 X |

Primary Examiner—Norman Yudkoff
Assistant Examiner—Kenneth P. Van Wyck
Attorney—Clarence A. O'Brien and Harvey B. Jacobson

[57] ABSTRACT

An improved method for the production of metal proteinates from an aqueous slurry of a proteinaceous precipitating reagent and a mineral source material such as a natural or synthetic brine, and/or from a reaction of dry salts mixed directly with a proteinaceous precipitating reagent known as the moist paste method, and wherein the precipitating reagent, in both cases is made by the base-acid-base hydrolysis of a protein-containing substance.

7 Claims, 1 Drawing Figure

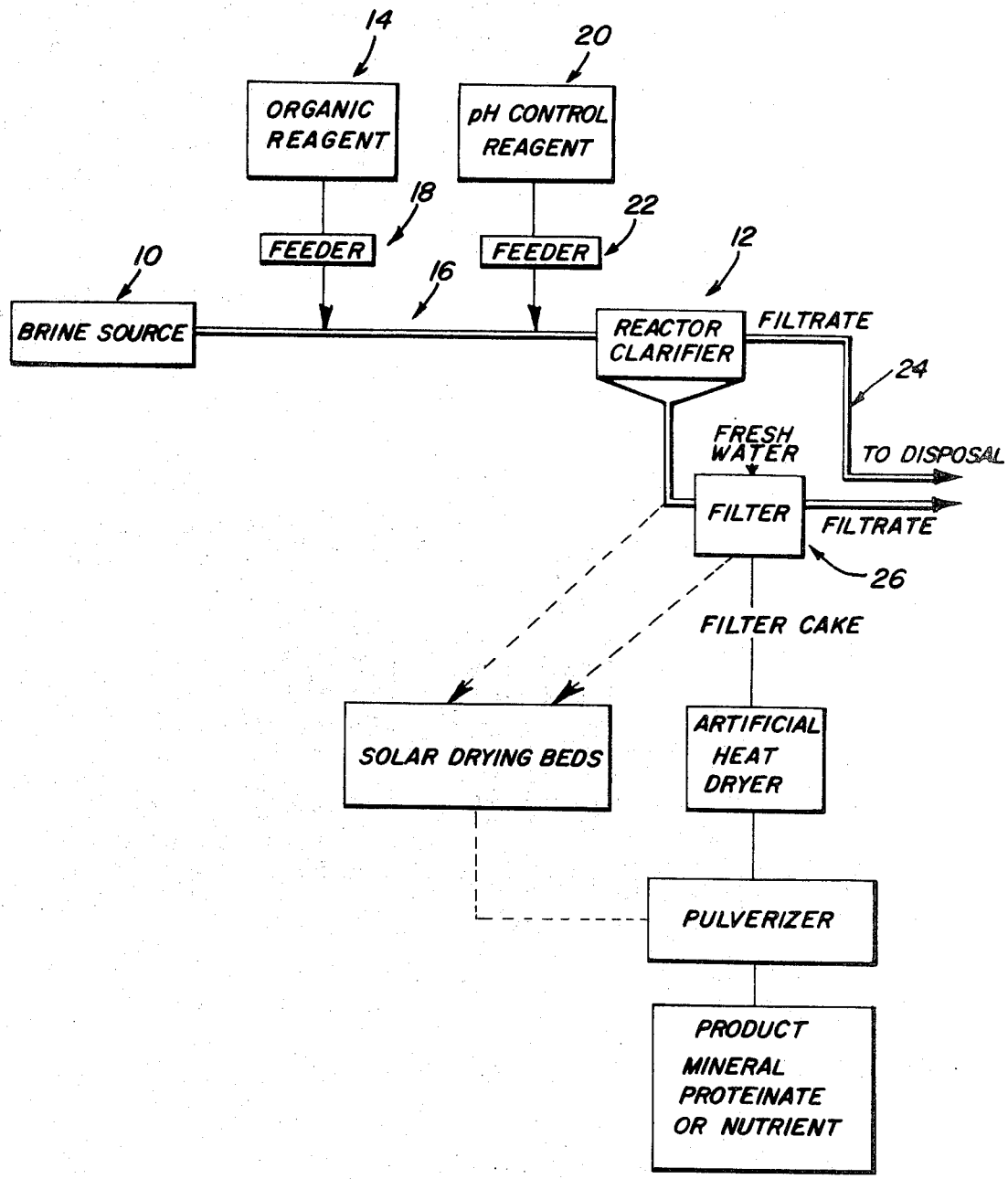

PRECIPITATION OF METAL PROTEINATES FROM BRINES BY BASE-ACID-BASE HYDROLYSIS

This is a continuation-in-part application of my earlier application Ser. No. 787,147, filed Dec. 26, 1968, now abandoned.

The present invention relates generally to an improved process for the precipitation of minerals from brines in the form of metal proteinates, and also in the production of feed grade and agricultural grade metal proteinates by the moist paste method using dry salts as the minerals source rather than brines, by the utilization of a proteinaceous precipitating reagent. More particularly, the present invention relates to an improved process for the preparation of the proteinaceous reagent utilizing base-acid-base hydrolyzation of the proteinaceous raw materials.

More specifically, the present invention relates to an improvement in the method of precipitating minerals from brines as disclosed in U.S. Pat. Nos. 3,374,081 and 3,396,104 to Miller, issued Mar. 19, 1968, and Aug. 6, 1968, respectively, the first of which is directed to a method of obtaining major and trace minerals from brines by the utilization of proteinaceous precipitating reagents resulting from the enzymatic degradation of animal manure, sewage, garbage, compost, humus, and fish by-products. As disclosed in said first Miller patent, two to four weeks are ordinarily required for the production of the proteinaceous precipitating reagents utilized therein inasmuch as they result from the enzymatic or bacterial degradation of vegetation composts, etc. It will thus be appreciated that the considerable period of time necessary for the preparation of the proteinaceous precipitating reagent renders the Miller process somewhat uneconomical, and undesirable, for the continuous production of feed and fertilizer grade metal proteinates.

The second Miller U.S. Pat. mentioned above (No. 3,396,104) is directed to a similar method of precipitating minerals from brines but using proteinaceous precipitating reagents made from raw materials which have been pre-treated with ammonia and phosphoric acid in that sequence instead of being produced by the enzymatic degradation method described in the first U.S. Pat. (No. 3,374,081).

It is a primary object of the present invention to provide an improved process for the precipitation of minerals, in the form of metal proteinates directly from the dry salts of said minerals, as well as from natural and synthetic brines to which the Miller patents are limited, by processing the dry salts thereof in the form of a moist paste mixture in the presence of a proteinaceous precipitating reagent derived from the base-acid-base hydrolysis of protein-containing vegetable matter, but using caustic soda and/or caustic potash as the first "base" treatment instead of ammonia as specified in Miller US. Pat. No. 3,396,104.

Another object of the present invention is to provide an improved economical method of making feed grade metal proteinates and organic plant nutrients by the mixing of dry mineral salts with a base-acid-base hydrolyzed proteinaceous reagent in a mixer-reactor apparatus utilizing only sufficient water to maintain the aforementioned mixture in a slurry or a moist paste form and wherein the pH necessary for an optimum precipitation reaction of the metal proteinates is established by the utilization of anhydrous ammonia, lime, or other favorable alkaline substances.

A further object of the present invention is to provide an improved process and apparatus system for the treatment of natural saline water, industrial waste brine, synthetic brine, dry salt, for the purpose of separating minerals and mineral compounds therefrom in the form of metal proteinates and wherein means are provided for continuously and proportionately admixing a base-acid-base hydrolyzed proteinaceous precipitating reagent to a continuous flow of an aqueous solution or slurry of a mineral source material followed by adjustment of the pH thereof to provide optimum conditions for the efficient precipitation of metal proteinates therefrom which is accomplished in a continuous flow reactor-clarifier where the metal proteinate and/or complexed organic-mineral compounds are flocculated, settled and thickened and the supernatant mineral depleted liquors decanted and disposed of followed by drying of the precipitated material or washing thereof with water prior to drying to leach out water-soluble components such as sodium for example.

These and other objects of the present invention will be readily apparent from the following more detailed description of the invention taken together with the drawing which comprises a flow diagram of a system for the continuous production of mineral-proteinate.

When proteinaceous compounds, fibrous vegetation, organic waste substances, and decomposition products thereof are utilized as the chelating and/or complexing reagents in the process of the present invention, the final products are found to contain "metal proteinate", which the Association of American Feed Control Officials defines metal proteinate as, "the product resulting from the chelation of a soluble salt with amino acids and/or partially hydrolyzed protein." Briefly, the present invention relates to the production of high quality metal proteinates for use in animal feeding and other technical uses by employing for the chelating or complexing reagent high protein vegetable substance such as corn gluten meal, yeast, flour mill by-products, etc., and non-toxic organic waste products from industry which control substantial amounts of protein, and even including animal manures, after subsequent treatment thereof by a base-acid-base hydrolysis. In addition, the present invention is suitable for the production of lesser-quality metal proteinates for use in soil fertilization, for example, by employing for the chelating or complexing reagent any selected protein-containing substance such as food processing wastes, fibrous vegetation, alfalfa, animal and bird manures, peat, sawdust, tree bark, etc., which material has been subjected to a base-acid-base hydrolysis. The afore discussed hydrolysis of the aforementioned raw protein-containing material consists of subjecting the protein-containing raw materials to a strong basic chemical reaction using caustic soda and/or caustic potash then to a strong acid chemical reaction using phosphoric acid as the primary reagent and finally to a strong basic chemical reaction using ammonia or lime. This triple treatment hydrolyzes certain organic components, i.e., proteins, present in the raw material and renders the raw material suitable as a chelating and complexing, i.e., precipitating, reagent. In addition, by utilization of a base-acid-base hydrolyzing procedure proteinaceous precipitating reagents may be manufactured in a substantially shorter period of time than is possible when utilizing enzymatic means for the preparation of analogous proteinaceous precipitating reagents. Furthermore, of has been found that the preparation of the precipitating reagents by a base-acid-base hydrolysis produces a reagent that does a superior job in synthesizing and precipitating the mineral proteinates and fertilizer minerals from the natural or synthetic brines that are being acted upon thereby, and for use in the dry salt paste method described herein.

The degree of hydrolyzation of the proteins in the raw material is a factor only in quality of the final product as "metal proteinates" are officially defined as products being made from amino acids and/or "partially" hydrolyzed protein.

According to one exemplary mode of carrying forth the present invention and in order to improve the quantity and efficiency of production of metal proteinates, it has been found possible to accomplish the same by utilizing a system schematically illustrated in the drawing wherein it will be seen that a natural or synthetic brine, slurried dry salt, etc., indicated as the brine source 10, is continuously fed to a reactor clarifier vessel 12 and wherein proteinaceous precipitating reagent, prepared by a base-acid-base reaction and stored in an organic reagent vessel 14 is proportionately metered into a flow line 16 connecting the brine source 10 and the reactor clarifier 12 by feeder means 18 and the pH of the brine-organic reagent flow in the line 16 adjusted by an alkaline reagent, i.e., ammonia and/or lime water supplied from a pH control reagent vessel 20 and metered into the line 16 by the metering means 22 and wherein the pH is adjusted to a value in the order of approximately pH 8 to pH 10. In this regard, it has been found that the utilization of lime water, preferably made from dolomite lime, rather than the utilization of ammonia for pH adjustment, oftentimes improves the precipitating action of the proteinaceous precipitating reagent while at the same time it adds additional magnesium and calcium to the final metal proteinate being produced. The controlled pH proteinaceous precipitating reagent-contacted brine or salt slurry in the ractor clarifier 12 separates into a lower phase comprising the precipitate product and an upper phase comprising a waste liquor comprising a filtrate which is decanted off and directed to disposal through conduit path 24. The precipitate product from the reactor clarifier 12 is directed to filter means 26 such as comprising a vacuum belt filter where a filter cake product is obtained and may, if desired, be washed with fresh water, for the removal of sodium chloride or other soluble salts which may be present in the filter cake product, after which the filter cake can be dried by suitable artificial or natural means prior to being pulverized to a fine powder having a density in the order of 45 lbs. to 55 lbs. per cubic foot and being only very slowly soluble in water. It will be understood that the sodium and potassium salts in the original brine source, being mono-valent, do not efficiently precipitate out, but remain in the supernatant liquor phase in the reactor clarifier and are disposed of with the liquor, and of course with the fresh water wash utilized to further purify the filter cake product.

When good quality dry salts are used as the raw material mineral source it is often desirable to leave all of the ingredients to the reaction in the final product. Therefore, in this case, no filtration, nor washing of the filter cake will be necessary to remove the water soluble secondary products which have been formed by the reaction of the minerals in the mineral salt used and the proteinaceous precipitating reagent. Said final, undried, product which is in the form of a wet slurry or undried paste, will go directly to the dryer and thence to the pulverizer, without filtration or washing. Particularly in the case where the metal proteinate is to be used as a fertilizer, the soluble ingredients which end up in the final product (i.e., ammonium and sulfate radicals, or potassium, etc.) are not objectionable constitutents, but on the contrary, are valuable soil nutrients.

The following examples are included to more specifically illustrate exemplary means of carrying forth the present invention.

EXAMPLE I 100 pounds of pulverized, or colloidalized, corn gluten meal, 60 percent protein, were placed in a closed mixer-reactor and 5 gallons of fresh water added thereto to form a wet slurry to which 10 pounds of caustic potash was added to bring the slurry to a basic reaction of between pH 10 and pH 11 after 10 minutes of mixing time. Approximately ½ pint of concentrated sulfuric acid and 3 gallons of 75 percent phosphoric acid was added to the alkaline corn gluten slurry with an attendant heat of reaction whereby the mixture turned to a thick paste having an acid reaction in the range of about pH 1. As mixing continues for another 10 minutes water molecules are consumed in the hydrolyzation of the organic substances in the paste mixture and the temperature rises to over 150° F due to the chemical reaction involved. To complete the base-acid-base hydrolysis, 15 pounds of anhydrous ammonia was added to the now acid paste mixture in the mixer-reactor but with continued stirring thereof, and the paste mixture was brought back to a strong basic reaction, in the order of about pH 10 after another 10 minutes mixing time. The temperature of the slurry being hydrolyzed usually rises to above 212° F and steam developed in the closed container but if this does not happen within 10 minutes due to extremely cold ingredients additional heat may be added by an external source if desired. Therefore, within a total mixing time of 30 minutes from start to finish the hydrolyzed product is ready to be used as the primary chelating, i.e., proteinaceous precipitating, reagent. Processing the precipitating reagent through a colloid mill to further reduce the finished reagent to extremely small particle size is sometimes helpful and if desired additional water may be added to enable the pumping of the finished organic reagent in the form of a slurry into the reactor clarifier 12 from the organic reagent vessel 14. In this particular instance, the brine source vessel 10 contained 3,000 gallons of concentrated natural sodium and magnesium brine, i.e., bitterns from the Great Salt Lake with a density of 29° Baume. The afore described reaction product (i.e., from 100 pounds of corn gluten meal, caustic potash, phosphoric acid and ammonia) was fed from the vessel 14 into the bitterns being delivered to the reactor clarifier 12 and the pH of the bitterns, when comingled with the organic reagent feed was adjusted with dolomitic lime water to a pH in the order of 8 to 10. The afore described reactants were thoroughly mixed by mechanical means in the reactor-clarifier. After settling from an 8 hour detention period the precipitated product in the reactor-clarifier 12 was well separated from the supernatant waste liquor and approximately 1,800 pounds of filter cake product was withdrawn from the bottom of the reactor clarifier as measured after filtering. The 1,800 pounds of filter cake product was that resulting from concentration of the precipitate from the reactor clarifier 12 by the filter means 26, such as comprising a vacuum belt filter. The washed filter cake product was then dried by the afore described means to yield only approximately 600 pounds of final mineral proteinate product which was held generally free of sodium chloride and contained approximately 12 percent of magnesium in the proteinate form together with some calcium and traces of other poly-valent minerals in about the same ratio amounts as they appeared in the original bitterns. The final dried product was ground to a fine powder in the pulverizer and is characterized by a white color, light and fluffy nature with a density in the order of 45 lbs. to 55 lbs. per cubic foot, friable to the touch, and only very slowly soluble in water. Furthermore, it was found that by using lime water made from calcined high-magnesium dolomite limestone as the pH control means instead of more expensive ammonia, where a little additional calcium in the final product is not detrimental, results in a distinct economic advantage.

EXAMPLE II

The method of Example I was repeated, i.e., a proteinaceous precipitating reagent was prepared from corn gluten as set forth therein using the base-acid-base method and was used as the proteinaceous reagent for the processing of a synthetic brine formed by dissolving approximately 100 pounds of copper sulfate in 100 gallons of water which reactants were fed to the reactor clarifier 12 wherein the pH was adjusted to a pH of not over 8 by using a lesser amount of lime water. This degree of alkilinity was found to be an optimum pH for flocculation precipitation of a copper proteinate. After settling, the supernatant blue liquor was decanted from the reactor clarifier 12 and the precipitated floc filtered in the means 26, dried with the resultant production of approximately 200 pounds of copper proteinate analyzing approximately 12% copper content.

The procedure set forth hereinabove has been carried forth with iron, zinc, manganese, cobalt, calcium, magnesium, and boron, depending upon the kind of synthetic brine prepared from commercial chemicals or the kind of brine obtained from some industrial wastes, such as the ferrous sulfate brines being wasted from copper precipitation plants in the western part of the United States. The proportions of proteinaceous material as well as the type and density of brine being utilized in the production of any specific metal proteinate product can be selectively adjusted in accordance with the teachings of the present invention as set forth hereinabove to obtain the optimum efficiency and results.

EXAMPLE III

When low cost commercial dry metal sulfates salts of copper, iron, zinc, manganese, cobalt, magnesium, or the hydroxides of calcium and dolomite are available as the mineral source, it is not necessary to completely dissolve these compounds or minerals in large quantities of water to make the quantity of brine that is represented by natural brines of the sea, or other brine sources, which are generally used for the recovery of magnesium and trace minerals because they contain a goodly percentage of magnesium chloride and magnesium sulfate. Instead, it has been found that synthesis of feed grade mineral proteinates, as well as the fertilizer grade mineral proteinates, can just as easily be obtained when using a minimum amount of water in the brine source vessel 10 to slurry or mix into a paste the mineral salt or mineral bearing compound prior to adding the base-acid-base proteinaceous precipitating reagent from the organic reagent vessel 14 thereto. It has been found that the chemical reaction between the partially hydrolyzed proteinaceous precipitating reagent and the inorganic salt or mineral compound, having its pH adjusted by the pH control reagent added from the vessel 20, is just as effective when it consists of a heavy wet paste condition in the reactor clarifier 12 as when the comparable inorganic salt or mineral is thoroughly dissolved in water such as for the preparation of a brine, and that the final metal proteinate products, without filtering or washing and thus containing all of the sulfate radical, nitrogen, potassium and phosphorus original ingredients, are in many instances more effective as mineral feed and fertilizer supplements, inasmuch as these additional items are effective nutrients and are supplemental to the primary metal proteinates which have been synthesized in this process. Furthermore, by proportioning the overall ingredients and by adjustment of the raw materials, the nitrogen, phosphorus and potassium content of the final product can be raised substantially when desired.

Pre-treatment of proteinaceous raw materials by the base-acid-base method described herein using caustic potash and/or caustic soda in its first stage to obtain partial hydrolysis of the protein is superior to the biochemical or enzymatic degradation method and/or to the base-acid pre-treatment method outlined by Miller with ammonia in its first stage treatment from the standpoint of production economy. This is because it has been found that the filtering characteristic of the final precipitated product, when separating the precipitate from the decant liquor or filtrate, is entirely different when the base-acid-base treated reagent is utilized as compared with the Miller product. Filtering is very difficult with a precipitate where the final "base" treatment has been omitted, as in the Miller process. The settling of the precipitate and the filtering, washing, and drying of same are primary factors in the economy of large scale production of high quality metal proteinates, and it has been found that by the use of caustic potash and/or caustic soda in the first stage of the pre-treatment, and further — by instituting a third stage in the pre-treatment of the proteinaceous raw material using the ammonia at that point — the settling and particularly the filtering characteristics of the final product can be improved as much as 500 percent over the Miller method product.

EXAMPLE IV

A 90 gram sample of liquid precipitate product slurry resulting from the use of the presently described base-acid-base pre-treatment reagent can be filtered to a resultant 60 percent moisture cake on a 12.5 c.m. dia. filter paper by use of a vacuum pump and Buchner funnel in less than 30 seconds, whereas, with other physical conditions equal, but using the Miller base-acid pre-treated reagent, the same amount of final precipitated product slurry takes more than 2 ½ minutes to be dewatered through the same size filter paper using the same funnel and vacuum to a 60 percent moisture cake specimen. On a production scale the presently described process is superior to the Miller process from an economic standpoint because the size and capacity of the process filtering equipment can be reduced by 500 percent when using the process described herein.

The foregoing is considered as illustrative only of the principles of the invention. Further, since numerous modifications and changes will readily occur to those skilled in the art, it is not desired to limit the invention to the exact method, operation and product shown and described, and accordingly all suitable modifications and equivalents may be resorted to, falling within the scope of the invention.

I claim:

1. In a method of obtaining feed and fertilizer grade organic mineral complexes, known as metal proteinates, by reacting a proteinaceous precipitating reagent and a mineral source material selected from the group consisting of natural brines, bitterns, synthetic brines, and dry mineral salts to form said organic mineral complexes in the nature of a precipitate, the improvement comprising:
   a. preparing said reagent by the base-acid-base hydrolysis of a protein containing substance selected from the group consisting of vegetable matter, vegetable matter degradation products and mixtures thereof; and
   b. admixing said reagent and said mineral source material and adjusting the pH of the resulting mixture to the range 8 to 10 whereby said reagent and said material source react to form said organic mineral complex precipitate.

2. A method, as claimed in claim 1, wherein said proteinaceous precipitating reagent and said mineral source material are admixed to form an aqueous slurry and further including the step of separating the precipitate from the aqueous phase of said slurry.

3. A method, as claimed in claim 1, wherein said mineral source material is a dry mineral salt and said proteinaceous precipitating reagent and said mineral source material are admixed to form an aqueous moist paste mixture, whereby said organic mineral complexes are formed in said moist paste which also contains all of the associated ingredient elements of the reaction.

4. A method, as claimed in claim 1, wherein the pH of said mixture is adjusted by addition thereto of a base selected from the group consisting of ammonia and lime water.

5. A method, as claimed in claim 1, wherein said base-acid-base hydrolysis comprises forming an aqueous slurry of said protein containing substance, adjusting the pH of said slurry with a base to the range 10 to 11; adjusting the pH of the resulting slurry to about 1 with an acid, and, adjusting the pH of the base-acid treated slurry to about 10 with a base.

6. A method, as claimed in claim 1, wherein said base-acid-base hydrolysis comprises forming an aqueous slurry of said protein containing substance, adjusting the pH of said slurry with a base selected from caustic soda and caustic potash to the range 10 to 11; adjusting the pH of the resulting slurry to about 1 with an acid selected from phosphoric acid, sulfuric acid and mixtures thereof; and, adjusting the pH of the base-acid treated slurry to about 10 with a base selected from ammonia and lime water.

7. A method, as claimed in claim 6, wherein said base-acid-base hydrolysis comprises forming an aqueous slurry of said protein containing substance; adjusting the pH of said slurry with caustic potash to pH 10-11; adjusting the pH of the resulting slurry with a mixture of sulfuric and phosphoric acids to a pH of about 1; and adjusting the pH of the base-acid treated slurry with ammonia to a pH of about 10.

* * * * *